United States Patent
Uchida et al.

(10) Patent No.: US 8,770,214 B2
(45) Date of Patent: Jul. 8, 2014

(54) GAS MIXTURE SUPPLYING METHOD AND APPARATUS

(75) Inventors: Yohei Uchida, Nirasaki (JP); Takahiro Yamamoto, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 537 days.

(21) Appl. No.: 12/644,745

(22) Filed: Dec. 22, 2009

(65) Prior Publication Data

US 2010/0154908 A1 Jun. 24, 2010

Related U.S. Application Data

(60) Provisional application No. 61/159,934, filed on Mar. 13, 2009.

(30) Foreign Application Priority Data

Dec. 22, 2008 (JP) .................................. 2008-325417

(51) Int. Cl.
  *C23C 16/455* (2006.01)
  *G05D 7/00* (2006.01)
  *H01L 21/00* (2006.01)
  *F17D 1/02* (2006.01)
  *B01F 3/02* (2006.01)

(52) U.S. Cl.
  USPC ................ 137/9; 137/606; 137/550; 118/715

(58) Field of Classification Search
  USPC .............. 137/9, 550, 597, 605, 606; 118/715
  See application file for complete search history.

(56) References Cited

U.S. PATENT DOCUMENTS

| | | | | |
|---|---|---|---|---|
| 4,642,279 A | * | 2/1987 | Tanigami et al. | 430/66 |
| 4,846,199 A | * | 7/1989 | Rose | 131/329 |
| 5,950,675 A | * | 9/1999 | Minami et al. | 137/606 |
| 6,051,072 A | * | 4/2000 | Harada | 118/715 |
| 6,138,586 A | * | 10/2000 | Reichart | 110/211 |
| 6,418,954 B1 | * | 7/2002 | Taylor et al. | 137/9 |
| 7,174,263 B2 | * | 2/2007 | Shajii et al. | 702/100 |
| 7,204,886 B2 | * | 4/2007 | Chen et al. | 118/715 |
| 7,275,558 B2 | * | 10/2007 | Abe | 137/271 |
| 2005/0120955 A1 | | 6/2005 | Yamasaki et al. | |
| 2006/0243207 A1 | * | 11/2006 | Jursich et al. | 118/715 |
| 2007/0287297 A1 | * | 12/2007 | Kikuchi et al. | 438/719 |
| 2009/0033140 A1 | * | 2/2009 | Pile et al. | 299/10 |
| 2009/0148244 A1 | * | 6/2009 | Snowdon | 406/28 |
| 2010/0206304 A1 | * | 8/2010 | Kim et al. | 126/91 R |

FOREIGN PATENT DOCUMENTS

| | | |
|---|---|---|
| CN | 1650045 A | 8/2005 |
| JP | 9-283504 | 10/1997 |
| JP | 2004-363522 A | 12/2004 |
| JP | 3745413 B2 | 12/2005 |
| JP | 2007-200918 A | 8/2007 |

* cited by examiner

*Primary Examiner* — Atif Chaudry
(74) *Attorney, Agent, or Firm* — Rothwell, Figg, Ernst & Manbeck, P.C.

(57) ABSTRACT

A gas mixture supplying method includes supplying plural kinds of gases through gas supply lines connected to a common pipeline and supplying a gas mixture of the plural kinds of gases from a gas outlet of the common pipeline to a region where the gas mixture is used through a gas mixture supply line. When two or more gases having different flow rates are supplied simultaneously, a gas having a relatively low flow rate is supplied from one of the gas supply lines provided at a position closer to the gas outlet than that for a gas having a relatively high flow rate.

7 Claims, 4 Drawing Sheets

GAS MIXTURE SUPPLYING METHOD AND APPARATUS

CROSS-REFERENCE TO RELATED APPLICATIONS

This application claims priority to Japanese Patent Application No. 2008-325417 filed on Dec. 22, 2008, the entire contents of which are incorporated herein by reference.

FIELD OF THE INVENTION

The present invention relates to a gas mixture supplying method and apparatus for use in, for example, a semiconductor manufacturing apparatus.

BACKGROUND OF THE INVENTION

Conventionally, a gas mixture supplying apparatus for mixing and supplying gases, so-called a gas box or the like, is generally employed when a gas mixture including different kinds of gases is supplied as a processing gas into a region where the gas mixture is used such as a processing chamber of a semiconductor manufacturing apparatus, e.g., when an etching gas is supplied into a processing chamber of a plasma etching apparatus.

The gas mixture supplying apparatus is configured to mix and supply plural gases through a plurality of gas supply lines connected to one common pipeline (manifold) and then to supply the mixture of the gases into the region where the gas mixture is used through a gas mixture supply line via a gas outlet of the common pipeline. Further, conventionally, a gas having a highest flow rate or largest molecular weight is supplied from a gas supply line located closest to the gas outlet, whereas a gas having a lowest flow rate or smallest molecular weight is supplied from a gas supply line located farthest from the gas outlet (see, e.g., Japanese Patent Application Publication No. 1997-283504 and its corresponding U.S. Pat. No. 5,950,675).

However, the present inventors have conducted a research and found that when a higher-flow-rate gas and a lower-flow-rate gas were flowed together at the same time, the higher-flow-rate gas was filled up in the pipeline and impeded a flow of the lower-flow-rate gas, thus resulting in a great delay in arrival time of the lower-flow-rate gas at the processing chamber.

SUMMARY OF THE INVENTION

In view of the foregoing, the present invention provides a gas mixture supplying method and apparatus capable of supplying a preset gas mixture to a region where the gas mixture is used such as a processing chamber more quickly by suppressing a delay in arrival time of a lower-flow-rate gas at the processing chamber.

In accordance with an aspect of the present invention, there is provided a gas mixture supplying method, including: supplying plural kinds of gases through gas supply lines connected to a common pipeline; and supplying a gas mixture of the plural kinds of gases from a gas outlet of the common pipeline to a region where the gas mixture is used through a gas mixture supply pipeline, wherein, when two or more gases having different flow rates are supplied simultaneously, a gas having a relatively low flow rate is supplied from one of the gas supply lines provided at a position closer to the gas outlet than that for a gas having a relatively high flow rate.

In accordance with another aspect of the present invention, there is provided a gas mixture supplying apparatus for supplying a gas mixture, including: a common pipeline having a gas outlet; gas supply lines connected to the common pipeline, for supplying plural kinds of gases; and a gas mixture supply pipeline for supplying the gas mixture of the plural kinds of gases through the gas outlet of the common pipeline to a region where the gas mixture is used, wherein, when two or more gases having different flow rates are supplied simultaneously, a gas having a relatively low flow rate is supplied from one of the gas supply lines provided at a position closer to the gas outlet than that for a gas having a relatively high flow rate.

In accordance with the present invention, there are provided a gas mixture supplying method and apparatus capable of supplying a preset gas mixture to a region where the gas mixture is used such as a processing chamber more quickly by suppressing a delay in arrival time of a relatively low flow-rate gas at the processing chamber.

BRIEF DESCRIPTION OF THE DRAWINGS

The objects and features of the present invention will become apparent from the following description of embodiments, given in conjunction with the accompanying drawings, in which.

DETAILED DESCRIPTION OF EMBODIMENT

Hereinafter, an embodiment of the present invention will be described with reference to the accompanying drawings which form a part hereof.

Figure 1:
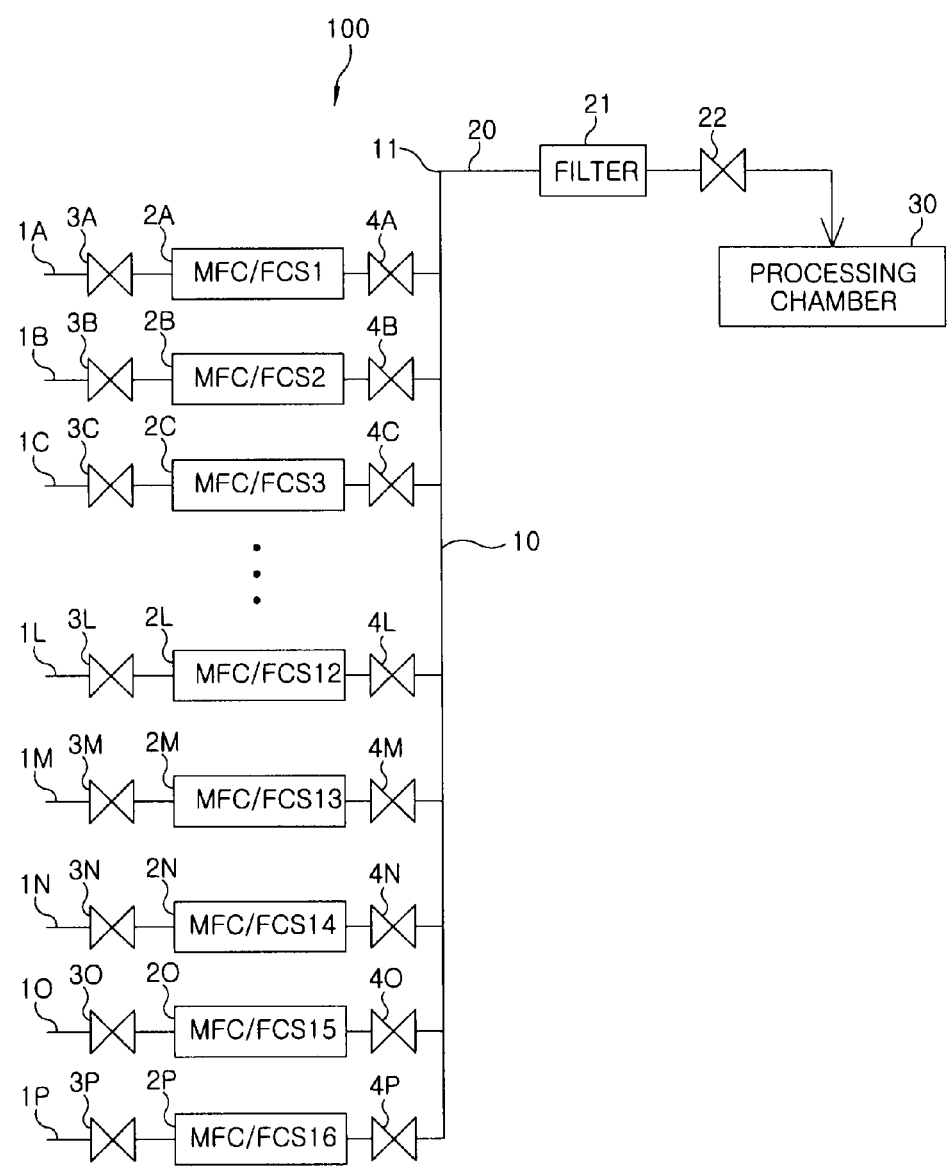
FIG. 1 is a schematic view of a gas mixture supplying apparatus.

FIG. 1 is a schematic view of a gas mixture supplying apparatus in accordance with an embodiment of the present invention. As illustrated in FIG. 1, a gas mixture supplying apparatus 100 includes a plurality of gas supply lines 1A to 1P (16 lines in the present embodiment) corresponding to plural kinds of gases, and one ends of these respective gas supply lines 1A to 1P are connected to one common pipeline (manifold) 10.

The other ends of the respective gas supply lines 1A to 1P are connected to non-illustrated gas supply sources. Further, the gas supply lines 1A to 1P are provided with gas flow rate controllers (MFC or FCS) 2A to 2P, valves 3A to 3P, valves 4A to 4P, and so forth, respectively.

Further, a gas outlet 11 at one end of the common pipeline (manifold) 10 is connected to a gas mixture supply pipeline 20, which is connected with a processing chamber 30 of a semiconductor manufacturing apparatus (e.g., plasma etching apparatus) which is a region where the gas mixture is used. A filter 21 for removing particles from the gas mixture, a valve 22, and so forth are provided in the gas mixture supply pipeline 20.

In the present embodiment, when two or more kinds of gases having different flow rates are supplied simultaneously, a gas having a relatively low flow rate is supplied from one of gas supply lines 1A to 1P, which is located closer to the gas outlet 11 than any other gas supply lines for supplying gases having relatively high flow rate. Further, among the plural kinds of gases, a gas having a lowest flow rate is supplied from the gas supply line 1A located closest to the gas outlet 11, while a gas having a highest flow rate is supplied from the gas supply line 1P located farthest from the gas outlet 11.

Figure 4:
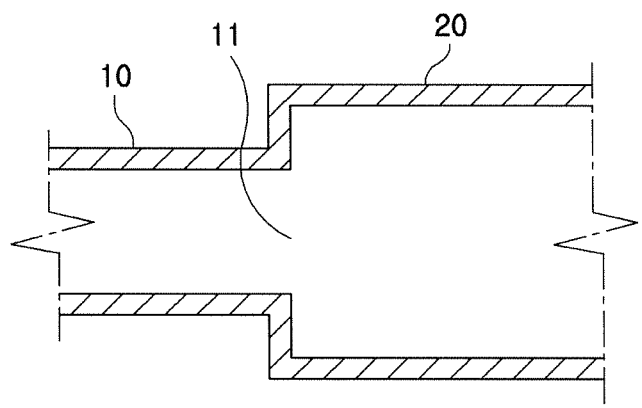
FIG. 4 is a cross-sectional view of a gas mixture supply pipeline and a common pipeline.

Further, the common pipeline (manifold) 10 is configured such that an inner diameter thereof is smaller (thinner) than an inner diameter of the gas mixture supply pipeline 20. In the present embodiment, the inner diameters of the common pipeline (manifold) 10 and the gas mixture supply pipeline 20 are set to be about 6.35 mm (¼ inch) and about 12.7 mm (½ inch), respectively. See, e.g., FIG. 4. Preferably, the inner diameter of the common pipeline (manifold) 10 may be set to be equal to or smaller than about 6.35 mm (¼ inch) and the inner diameter of the gas mixture supply pipeline 20 may be set to be equal to or larger than about 12.7 mm (½ inch). Description why the above set is preferable will be described in detail later.

In comparison, in a conventional gas mixture supplying apparatus, a common pipeline (manifold) and a gas mixture supply pipeline is configured to have the same inner diameter. For example, their inner diameter is set to be, e.g., 12.7 mm (½ inch).

Now, a gas mixture supplying method using the above-described gas mixture supplying apparatus 100 will be discussed. As mentioned above, when two or more gases having different flow rates are supplied simultaneously, a gas having a relatively low flow rate is supplied from one of gas supply lines 1A to 1P, which is located closer to the gas outlet 11 than any other gas supply lines for supplying gases having relatively high flow rate in the present embodiment.

For example, assume that Ar gas and $O_2$ gas are supplied simultaneously, and a gas mixture of the Ar gas and the $O_2$ gas is supplied into the processing chamber 30. When a flow rate of the $O_2$ gas is lower than that of the Ar gas, the $O_2$ gas is supplied from one of the gas supply lines 1A to 1P located closer to the gas outlet 11 than a gas supply line from which the Ar gas is supplied.

Specifically, for example, the Ar gas is supplied from the gas supply line 1M located at the $13^{th}$ position farther from the gas outlet 11, while the $O_2$ gas is supplied from the gas supply line 1L located at the $12^{th}$ position farther from the gas outlet 11. As an experiment (example 1) for testing such case, the Ar gas/$O_2$ gas were actually flowed at flow rates of 500/20 sccm, 500/50 sccm, 1000/20 sccm, 1000/50 sccm, 1000/100 sccm, respectively, and the gases reaching the processing chamber 30 were analyzed by using a mass spectrometer (Q-MASS), and arrival times (times taken for the gases to reach the processing chamber 30 after their supply is begun) of the Ar gas and the $O_2$ gas were investigated. The result is provided in Table 1.

Further, as a comparative example 1, arrival times of the Ar gas and the $O_2$ gas were investigated for the case that the Ar gas was supplied from the gas supply line 1A located closest to the gas outlet 11, while the $O_2$ gas was supplied from the gas supply line 1L located at the $12^{th}$ position from the gas outlet 11. The result is also shown in Table 1.

Figure 2:
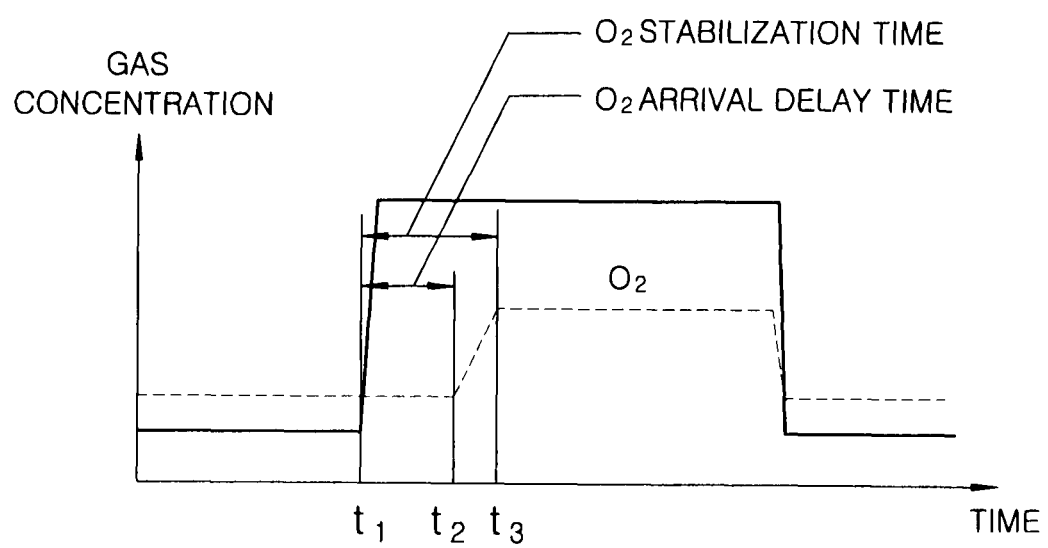
FIG. 2 is a graph for describing an arrival time and a stabilization time of an $O_2$ gas.

As for the analysis result by the mass spectrometer (Q-MASS), a gas concentration distribution illustrated in FIG. 2 shows that an $O_2$ gas concentration began to increase in a certain delay time after an increase of a Ar gas concentration was begun as shown by a solid line in the graph, and the $O_2$ gas concentration was stabilized after a while. In FIG. 2, $t_1$ indicates a time when the Ar gas concentration begins to increase after the Ar gas is supplied (that is, the time taken for the Ar gas to reach the processing chamber 30 after the Ar gas supply is begun), $t_2$ indicates a time when the $O_2$ gas concentration begins to increase after the $O_2$ gas is supplied (that is, the time taken for the $O_2$ gas to reach the processing chamber 30 after the $O_2$ gas supply is begun), and $t_3$ indicates a time when the $O_2$ gas concentration is stabilized.

In Table 1, "$t_2-t_1$" means a time period until the $O_2$ gas concentration begins to increase after the Ar gas concentration begins to increase and "$t_3-t_1$" indicates a time period until the $O_2$ gas concentration is stabilized after the Ar gas concentration begins to increase, and results of "$t_2-t_1$" and "$t_3-t_1$" according to "example 1" and "comparative example 1" are provided, respectively.

TABLE 1

|  | Ar/$O_2$ | 500/20 (sccm) | 500/50 (sccm) | 1000/20 (sccm) | 1000/50 (sccm) | 1000/100 (sccm) |
| --- | --- | --- | --- | --- | --- | --- |
| Example 1 | $t_2 - t_1$ (sec) | SMLTNS with Ar | SMLTNS with Ar | SMLTNS with Ar | SMLTNS with Ar | SMLTNS with Ar |
|  | $t_3 - t_1$ (sec) | 4.0 | 4.0 | 4.6 | 5.2 | 3.3 |
| Comparative Example 1 | $t_2 - t_1$ (sec) | 10.6 | 4.6 | 15.9 | 6.6 | 3.9 |
|  | $t_3 - t_1$ (sec) | 15.9 | 7.3 | 20.6 | 9.3 | 5.9 |

*SMLTNS: Simultaneous

As shown in Table 1, in the example 1, the time when the $O_2$ gas concentration begins to increase was substantially the same as the time when the Ar gas concentration begins to increase, and the $O_2$ gas concentration became stable in about 3.3 to 5.2 sec after the Ar gas concentration began to increase. In contrast, in the comparative example 1, the $O_2$ gas concentration began to increase about 3.9 to 15.9 sec after the Ar gas concentration began to increase, and the $O_2$ gas concentration became stable about 5.9 to 20.6 sec after the Ar gas concentration began to increase. As can be clearly seen from these results, both the arrival time of the $O_2$ gas at the processing chamber 30 and the $O_2$ gas stabilization time can be greatly reduced as compared to those of the comparative example 1.

In the comparative example 1, the reason for a greater delay in the arrival time of the $O_2$ gas having a relatively low flow rate is deemed to be as follows.

Figure 3:
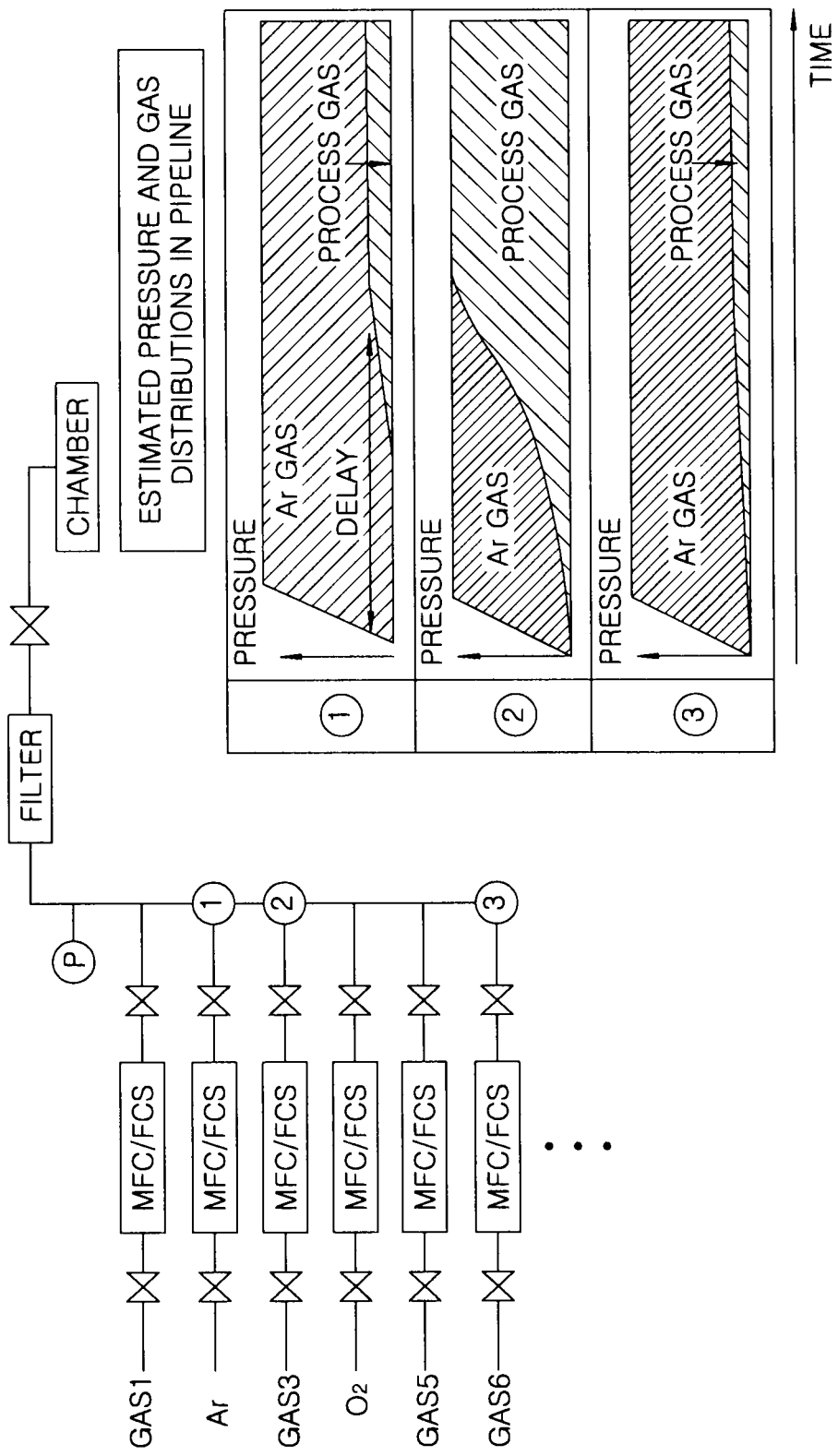
FIG. 3 is an illustration for describing a reason for a delay in arrival time of a relatively low flow-rate gas.

FIG. 3 shows estimated pressure and gas distributions at respective positions 1, 2 and 3 within the common pipeline (manifold), in case that the Ar gas having a relatively high flow rate is supplied from a gas supply line positioned closer to the gas outlet, and the $O_2$ gas and other processing gases having relatively low flow rate are supplied from gas supply lines positioned farther from the gas outlet than the gas supply line for the Ar gas.

As shown in FIG. 3, when the Ar gas having the relatively high flow rate is supplied into the common pipeline (manifold) from the position 1 close to the gas outlet, it is conjectured that the Ar gas may flow backward to the positions 2 and 3 within the common pipeline (manifold), and it may take time for the $O_2$ gas and the like having the relatively low flow rate to reach the processing chamber by the Ar gas flowing against their flows.

To shorten the arrival time of the gas mixture at the processing chamber 30, as described above, it may be also effective to reduce an internal volume of the common pipeline (manifold) 10. In such a case, by reducing an inner diameter of the common pipeline (manifold) 10, the arrival time of the gas mixture at the processing chamber 10 can be reduced. If, however, the internal diameter of the pipeline is reduced, conductance may be reduced, which in turn may cause a delay of the arrival time of the gas mixture at the processing chamber 30.

Therefore, it is preferable to make an inner diameter of the gas mixture supply pipeline 20 greater than the inner diameter of the common pipeline (manifold) 10. Further, the filter 21 provided on the gas mixture supply pipeline 20 preferably have a high conductance and a low pressure loss. As stated above, in the present embodiment, the inner diameter of the common pipeline (manifold) 10 is set to about 6.35 mm (¼ inch), and the inner diameter of the gas mixture supply pipeline 20 is set to about 12.7 mm (½ inch).

An arrival time of a gas having a relatively low flow rate depending on the inner diameter of the common pipeline (manifold) 10 was investigated, and the result is provided as follows. In this experiment, to investigate an effect of the difference in the inner diameter of the common pipeline in case that delay of arrival time is great, the Ar gas was supplied from the gas supply line 1B provided at the $2^{nd}$ position from the gas outlet 11, and the $O_2$ gas was supplied from the gas supply line 1P provided at the $16^{th}$ position farthest from the gas outlet 11. Further, the Ar gas/$O_2$ gas were actually flowed at flow rates of about 500/10 sccm, 500/20 sccm, 500/50 sccm, 500/70 sccm, 1000/10 sccm, 1000/20 sccm, 1000/50 sccm, 1000/70 sccm, and the gases reaching the processing chamber 30 were analyzed by using the mass spectrometer (Q-MASS), and times taken for the gases to reach the processing chamber 30 after their supply is begun (the Ar gas arrival time ($t_1$) and the $O_2$ gas arrival time ($t_2$)) and the $O_2$ gas stabilization time ($t_3$) were investigated (see FIG. 2). Results of "$t_2-t_1$" and "$t_3-t_1$" are provided in Table 2.

As shown in Table 2, when the inner diameter of the common pipeline (manifold) was set to about 6.35 mm (¼ inch), both the arrival time of the $O_2$ gas at the processing chamber 30 and the $O_2$ gas stabilization time was be greatly reduced as compared to the case that the inner diameter of the common pipeline (manifold) 10 was set to about 12.7 mm (½ inch).

In addition, as an example method for increasing the conductance of the gas mixture supply pipeline 20 as described above, the filter 21 inserted in the gas mixture supply pipeline 20 was changed from a conventional filter (available at the market) to a low-pressure-loss filter having a gas-through surface area twice as large as that of the conventional filter, and the inner diameter of the common pipe line (manifold) 10 was set to be about 6.35 mm (¼ inch). In such a case, times taken for the gases to reach the processing chamber 30 after their supply is begun (the Ar gas arrival time ($t_1$) and the $O_2$ gas arrival time ($t_2$)) and the $O_2$ gas stabilization time ($t_3$) were investigated in the same manner as described above. In this case, the results of "$t_2-t_1$" and "$t_3-t_1$" are also provided in Table 2.

As can be seen from Table 2, when the low-pressure-loss filter was used, both the $O_2$ gas arrival time and the $O_2$ gas stabilization time was reduced in the most of the flow rate range, as compared to the case that only the inner diameter of the common pipeline (manifold) 10 was reduced to 6.35 mm (¼ inch) without using the low-pressure-loss filter. Accordingly, the conductance of the gas mixture supply pipeline 20 is increased preferably by, for example, using a low-pressure-loss filter as the filter 21, enlarging the inner diameter of the gas mixture supply pipeline 20 or the like.

Moreover, the present invention is not limited to the above-described embodiment and examples but various changes and modifications can be made. For example, the processing chamber 30 is not limited to that of the plasma etching apparatus, but may be a processing chamber of a film forming apparatus such as a CVD (Chemical Vapor Deposition) apparatus. Furthermore, the number of the gas supply lines may be more than or less than 16 without being limited to 16.

While the invention has been shown and described with respect to the embodiment, it will be understood by those skilled in the art that various changes and modification may be made without departing from the scope of the invention as defined in the following claims.

What is claimed is:

1. A gas mixture supplying method for supplying a gas mixture to a semiconductor manufacturing apparatus, comprising:

supplying plural kinds of gases through gas supply lines connected to a common pipeline;

supplying the plural kinds of gases from a gas outlet of the common pipeline to a gas mixture supply pipeline, and supplying a gas mixture from the gas mixture supply

TABLE 2

| Inner diameter of common pipeline | Ar/$O_2$ | 500/10 (sccm) | 500/20 (sccm) | 500/50 (sccm) | 500/70 (sccm) | 1000/10 (sccm) | 1000/20 (sccm) | 1000/50 (sccm) | 1000/70 (sccm) |
|---|---|---|---|---|---|---|---|---|---|
| ½ inch | $t_2 - t_1$ (sec) | 14.0 | 7.5 | 0.9 | 2.5 | 20.7 | 10.8 | 5.0 | 2.5 |
|  | $t_3 - t_1$ (sec) | 20.6 | 15.8 | 9.1 | 7.4 | 24.7 | 21.4 | 14.9 | 7.5 |
| ¼ inch | $t_2 - t_1$ (sec) | 4.3 | 3.0 | 1.4 | SMLTNS with Ar | 7.2 | 3.6 | 2.1 | 0.6 |
|  | $t_3 - t_1$ (sec) | 7.2 | 5.9 | 4.3 | 5.9 | 10.1 | 7.3 | 5.8 | 5.7 |
| ¼ inch + low-pressure loss | $t_2 - t_1$ (sec) | 3.0 | 2.2 | SMLTNS with Ar | SMLTNS with Ar | 3.7 | 3.7 | 1.5 | 1.5 |
|  | $t_3 - t_1$ (sec) | 6.0 | 5.2 | 5.9 | 5.2 | 7.3 | 6.6 | 3.6 | 4.4 |

* SMLTNS: Simultaneous pipeline to a processing chamber of the semiconductor manufacturing apparatus where the gas mixture is used; and arranging the gas supply lines, the common pipeline, and the gas mixture supply pipeline so as to reduce a stabilization time of the gas mixture at the processing chamber by:

(a) providing a first gas having a relatively low flow rate which is supplied from a first gas supply line of the gas supply lines at a first position which is closer to the gas outlet than a second position at which a second gas supply line of the gas supply lines supplies a second gas having a relatively high flow rate; and (b) reducing the gas mixture stabilization time of a gas mixture of the first gas and the second gas compared to an arrangement in which an inner diameter at a portion of the common pipeline upstream from the gas outlet is set to be the same as an inner diameter of the gas mixture supply pipeline by providing the inner diameter at the portion of the common pipeline that is upstream from the gas outlet to be smaller than the inner diameter of the gas mixture supply pipeline, wherein the gas mixture supply pipeline is disposed between the processing chamber and the common pipeline, and wherein the common pipeline has a constant inner diameter along an entire length of the common pipeline, the common pipeline extending from the gas supply lines to the gas outlet.

2. The gas mixture supplying method of claim 1, wherein, among the plural kinds of gases, a gas having a lowest flow rate is supplied from the gas supply line provided at a position closest to the gas outlet, while a gas having a highest flow rate is supplied from the gas supply line provided at a position farthest from the gas outlet.

3. The gas mixture supplying method of claim 2, wherein a filter is provided in the gas mixture supply pipeline to remove particles from the gas mixture.

4. The gas mixture supplying method of claim 2, wherein an inner diameter of the common pipeline is ¼ inch, and an inner diameter of the gas mixture supply pipeline is ½ inch.

5. The gas mixture supplying method of claim 1, wherein a filter is provided in the gas mixture supply pipeline to remove particles from the gas mixture.

6. The gas mixture supplying method of claim 1, wherein an inner diameter of the common pipeline is ¼ inch, and an inner diameter of the gas mixture supply pipeline is ½ inch.

7. The gas mixture supplying method of claim 1, further including providing a valve along the gas mixture supply pipeline.

* * * * *